United States Patent [19]

Kahn

[11] 4,389,642
[45] Jun. 21, 1983

[54] DIGITAL MATRIX SWITCHING

[76] Inventor: William M. Kahn, 600 Pleasant St., Watertown, Mass. 02154

[21] Appl. No.: 279,323

[22] Filed: Jul. 1, 1981

[51] Int. Cl.³ .............................................. H04Q 9/00
[52] U.S. Cl. .................................. 340/825.03; 370/53
[58] Field of Search ...................... 340/825.03, 825.27; 370/53, 58, 92; 179/18 ES

[56] References Cited

U.S. PATENT DOCUMENTS 4,220,823  9/1980  Littlefield ........................... 370/53
4,271,505  6/1981  Menot et al. ....................... 370/92

Primary Examiner—Donald J. Yusko

Attorney, Agent, or Firm—Charles Hieken

[57] ABSTRACT

Eight input ports are sampled once every eight clock pulse intervals, and the samples are multiplexed to an eight-bit collecting register that stores data bit signals from selected input ports in cells corresponding to the location of designated output ports selected in accordance with selection signals stored in a 64-bit RAM having eight-bit words that may be changed to designate the connections among input ports and output ports for data transfer. The data signals in the eight-bit collecting register are transferred to an output holding register in cells corresponding to respective output ports that are released in response to the sample signal.

8 Claims, 1 Drawing Figure

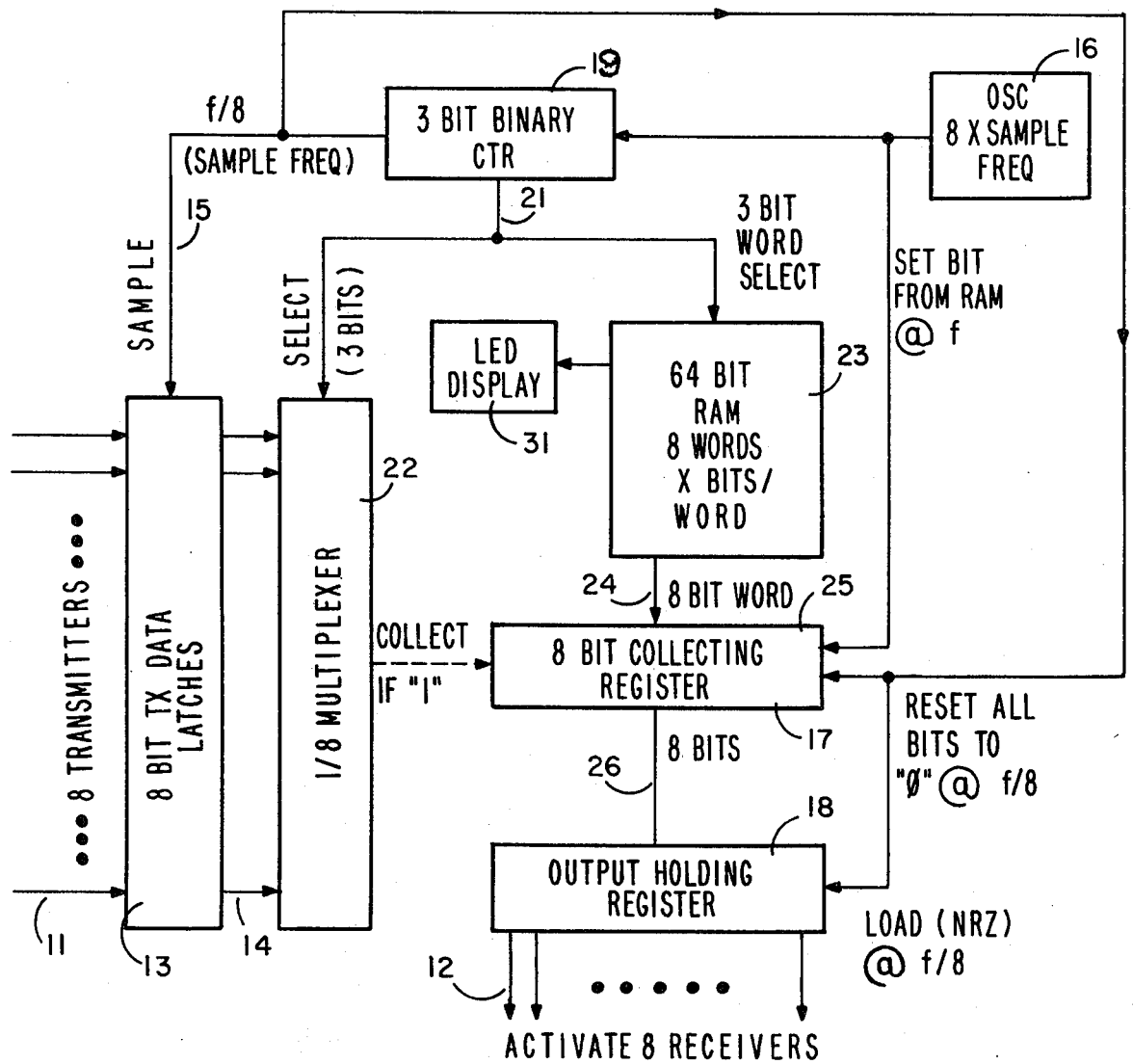

DIGITAL MATRIX SWITCHING

The present invention relates in general to digital matrix switching and more particularly concerns novel apparatus and techniques for exchanging digital data among a number of ports allowing establishment of any connection combination, separately switching transmit and receive data signals without switching glitches or transmission interruptions, and allowing one port to broadcast to the others.

The typical prior art approach for switching digital data involves routing data lines or signals through logic gates or switches.

According to the invention, there are a plurality (n) of input ports for receiving a corresponding plurality of input data signals to be transmitted. There is means for sampling each of the input ports for developing a corresponding plurality of data bits, and means for processing each of these data bits in one sample time. There is means for transferring each of these processed bits into an n-bit output holding register at a rate equal to the sampling frequency, one sample time later. There is means for transferring the data from the output holding register to respective output ports. The sampling rate is high enough to avoid distorting the digital waveform more than an acceptable amount. A feature of the invention is random access memory (RAM) or read-only memory (ROM) means for storing control bits representative of the desired switching arrangement, and means for accessing the RAM means n times during a sample period.

Numerous other features, objects and advantages of the invention will become apparent from the following specification when read in connection with the accompanying drawing, the FIGURE of which is a block diagram illustrating the logical arrangement of a system according to the invention.

With reference now to the drawing, there is shown a block diagram illustrating the logical arrangement of a specific embodiment of the invention having eight input ports 11 for receiving data from eight transmitters and eight output ports 12 for transmitting data to eight receivers. The eight input ports deliver input data for transmission to TX data latches 13 for holding the signals on the input ports during a sampling interval to provide sampled output signals on output lines 14 in response to sample pulses on line 15. An oscillator 16 provides pulses at a rate eight times sampling frequency that are delivered to three-bit binary counter 19 to provide sample pulses on line 15 delivered to sample inputs of collecting register 17 and output holding register 18 as well as TX data latches 13. The state of three-bit or stage binary counter 19 is carried by lines 21 coupled to multiplexer 22 and RAM 23 that may typically store eight words with eight bits per word and provide on output 24 an eight-bit word for controlling the flow of collected data received by eight-bit collecting register 25 having collected data from multiplexer 22 for delivery over the output lines 26 to output holding register 18.

Having briefly described the physical arrangement of a system according to the invention, its mode of operation will be described. In general the hardware for implementing an n×n switching matrix is approximately that for a 1×n system. The invention achieves this reduction by accessing the RAM n times during a sample period, thereby time-sharing the switching circuitry to implement the n×n switching matrix. This embodiment uses an 8×8 matrix. The single three-bit binary control counter 19 simultaneously addresses RAM 23 and multiplexer 22 for selecting one of the eight input ports 11 that are to be connected in any desired way to the eight output ports 12. If the selected input port is binary ONE, then the eight-bit word provided on lines 24 by RAM 23 are used to set (in effect perform the logic operation of "OR") corresponding bits in eight-bit collecting register 25. If the selected input port is then at binary ZERO, collecting register 25 remains unchanged. The eight-bit word read from RAM 23 is one row of the desired 8×8 switching matrix. After all eight input ports have been scanned in this manner, the collecting register contains the correct result for loading into output holding register 18 at the end of each sample interval in response to the sample signal provided on line 15. This sample signal also resets all bits in collecting register 25 to ZERO.

RAM 23 provides a number of advantages. Accessing a different section of RAM 23 allows switching from one array of connections to another. This feature allows a user to set up or program different connection arrangements in advance, and subsequently in actual use, simply select arrays rather than specific connections, thereby enhancing ease of operation. The same circuits that multiplex and control the switching apparatus may be used to write into RAM 23 and display its contents in an 8×8 LED display 31.

Alternatively RAM 23 may comprise the RAM of an associated microprocessor, such as a Z80, whereby the microprocessor may communicate with the user's terminal or computer connected to the invention.

The invention is embodied in the MICROMATRIX UNIVERSAL DATA SWITCHING EXCHANGE commercially available from Digital Laboratories, Inc., 600 Pleasant St., Watertown, MA 02172, and the disclosures therein are incorporated herein by reference.

In one form of the invention LED display 31 comprises 64 LEDs positioned in an 8×8 matrix surrounded by four column keys above and four column keys below and four row keys to the left and four row keys to the right. A connection is made by depressing a row key and a column key simultaneously, thereby effecting connection of the input port represented by the depressed row key to the output port represented by the depressed column key and illuminating the LED at the intersection of the designated row and column to indicate the connection thereby made.

There has been described novel apparatus and techniques for effecting switching among a number of ports. The specific embodiments have been used for switching digital data; however, the invention is useful for delta or pulse coded modulation (PCM) and may be applied to analog including voice grade switching systems. It is evident that those skilled in the art may now make numerous other uses and modifications of and departures from the specific embodiments disclosed herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:
1. Switching apparatus comprising,
a plurality of input ports,
a plurality of output ports, memory means for storing selection signals representative of selected data signal transfer paths between said input ports and said output ports, collecting register means for receiving sampled data signals from predetermined ones of said input ports and storing a sequence of bit signals representative thereof, means for sampling said input ports and transferring sampled data signals from selected ones of said input ports to said collecting register means in response to said selection signals provided by said memory means to store a sequence of bit signals representative of the transferred sampled data signals, means for initially setting each bit signal in said collecting register means to an initial state at the beginning of a sampling interval, means responsive to coincidence between a bit signal representative of a data signal then sampled by said means for sequentially sampling and a corresponding bit in a selection signal then provided by said memory means for altering the state of a corresponding bit signal during the sampling interval, and means for transferring the bit signals stored in said collecting register means to said output ports to thereby transfer signals on selected ones of said input ports to selected ones of said output ports in accordance with the selection signal provided by said memory means.

2. Switching apparatus in accordance with claim 1 and further comprising, input data latching means for holding signals representative of data signals on the input ports during a sampling interval, means for sequentially sampling the held signals to provide selected data bit signals to said collecting register means, an output holding register for storing data bit signals to be transferred to selected output ports, and means for coupling the signals in said collecting register means to said output holding register means.

3. Switching apparatus in accordance with claim 2 and further comprising, a source of clock pulses, a binary counter energized by said clock pulses for providing a sample signal applied to said latching means for effecting sampling of said input ports and a count signal representative of a particular input port then being sampled and providing said count signal to said means for sequentially sampling and said memory means, and means for coupling said clock pulses and said sample signal to said collecting register means.

4. Switching apparatus in accordance with claim 1 wherein said memory means comprises RAM means with sufficient memory cells for storing selection signals to allow differing switching arrangements to be selected.

5. Switching apparatus in accordance with claim 1 and further comprising row and column switching means for selectively interconnecting points in an n×n switching array.

6. Switching apparatus in accordance with claim 1 and further comprising means for displaying the switching arrangement then intercoupling said ports in an n×n matrix format.

7. Switching apparatus in accordance with claim 1 wherein said memory means is a RAM time-shared with a (micro)computer.

8. Switching apparatus in accordance with claim 1 and further comprising a source of a scanning signal for designating each input port then being sampled scanned, and means for coupling said scanning signal to both said means for sequentially scanning and said memory means.

* * * * *